(12) United States Patent
Nishino et al.

(10) Patent No.: US 8,125,158 B2
(45) Date of Patent: Feb. 28, 2012

(54) INSULATION TYPE AC-DC CONVERTER AND LED DC POWER SUPPLY DEVICE USING THE SAME

(75) Inventors: Hiroyuki Nishino, Hirakata (JP); Eiji Shiohama, Katano (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 371 days.

(21) Appl. No.: 12/524,640

(22) PCT Filed: Jan. 30, 2008

(86) PCT No.: PCT/JP2008/051340
§ 371 (c)(1),
(2), (4) Date: Jul. 27, 2009

(87) PCT Pub. No.: WO2008/093692
PCT Pub. Date: Aug. 7, 2008

(65) Prior Publication Data
US 2010/0109571 A1    May 6, 2010

(30) Foreign Application Priority Data

Jan. 30, 2007 (JP) ................................. 2007-019081

(51) Int. Cl.
*H05B 37/02* (2006.01)
*H05B 41/36* (2006.01)
(52) U.S. Cl. ........................................ 315/247; 315/307
(58) Field of Classification Search .................. 315/174, 315/175, 223, 209 R, 219, 224, 307, 247
See application file for complete search history.

(56) References Cited

U.S. PATENT DOCUMENTS

| 5,907,223 | A | 5/1999 | Gu |
| 6,418,038 | B2 | 7/2002 | Takahama et al. |
| 6,437,515 | B1 * | 8/2002 | Kamoi et al. ............. 315/209 R |

(Continued)

FOREIGN PATENT DOCUMENTS

EP    1704954    9/2006

(Continued)

OTHER PUBLICATIONS

English language Abstract of JP 7-327361, Dec. 12, 1995.

(Continued)

*Primary Examiner* — Don Le
(74) *Attorney, Agent, or Firm* — Greenblum & Bernstein, P.L.C.

(57) ABSTRACT

In an insulation type AC-dc converter in which input current from a commercial power supply is converted to obtain insulated direct current, the overall efficiency is raised and the structure is simplified. A multi-resonance type half-bridge DC-DC converter having an insulation transformer T is used as a first converter, and a boosting chopper circuit for power factor improvement is used as a second converter. Hence through multi-resonance operation, increases in losses can be suppressed even when the switching frequency is raised, and because a half-bridge circuit is used, switching elements and similar with lower voltage ratings can be employed, whereby overall efficiency can be increased. Moreover, a voltage substantially similar to the full-wave rectified waveform of the power supply voltage is obtained from the output capacitor at the boosting chopper circuit input, whereby there is no need for a feed-forward circuit across the insulation transformer, and moreover the electrolytic capacitor which had to be provided on the converter input side is unnecessary. This is advantageous for achieving miniaturization and a thin design.

14 Claims, 13 Drawing Sheets

U.S. PATENT DOCUMENTS

| | | |
|---|---|---|
| 2002/0012257 A1 | 1/2002 | Takahama et al. |
| 2002/0145041 A1 | 10/2002 | Muthu et al. |
| 2006/0213890 A1 | 9/2006 | Kooken et al. |
| 2009/0315470 A1* | 12/2009 | Kumagai et al. ............... 315/224 |
| 2010/0176737 A1* | 7/2010 | Nakada et al. ................. 315/219 |
| 2011/0018453 A1* | 1/2011 | Hasegawa et al. ............ 315/224 |
| 2011/0089846 A1* | 4/2011 | Ido ............................ 315/209 R |

FOREIGN PATENT DOCUMENTS

| | | |
|---|---|---|
| JP | 6-78535 | 3/1994 |
| JP | 7-327361 | 12/1995 |
| JP | 2514885 | 4/1996 |
| JP | 2001-359279 | 12/2001 |
| JP | 3371595 | 11/2002 |
| JP | 2006-230135 | 8/2006 |
| JP | 2006-296158 | 10/2006 |
| WO | 02/058223 | 7/2002 |
| WO | 02/076150 | 9/2002 |

OTHER PUBLICATIONS

English language Abstract of JP 2001-359279, Dec. 26, 2001.
English language Abstract of JP 2006-296158, Oct. 26, 2006.
English language Abstract of JP 2006-230135, Aug. 31, 2006.
English language Abstract of JP 3371595, Nov. 22, 2002.
English language Abstract of JP 2514885, Apr. 30, 1996.
Search report from E.P.O., mail date is Feb. 4, 2011.
Chinese Office Action dated Nov. 8, 2011.
Fan Hong-feng et al. "Comparison of LLC Reasonant Converter with Asymmetrical half Bridge Converter", Power Supply Technologies and Applications, vol. 7, No. 12, Dec. 2004.

* cited by examiner

INSULATION TYPE AC-DC CONVERTER AND LED DC POWER SUPPLY DEVICE USING THE SAME

TECHNICAL FIELD

The present invention relates to an insulation type AC-DC converter which converts input current from a commercial power supply to a high frequency and obtains insulated DC current, and to a DC power supply device for LEDs which uses such a converter, and in particular relates to a high-efficiency converter with an improved power factor.

BACKGROUND ART

By raising the switching frequency used in AC-DC converters which obtain a desired DC power from a commercial power supply, it is possible to reduce the sizes of the transformers, inductors, and other components used; but as the switching frequency is raised, increased switching losses and other circuit losses pose problems, and various circuit-related innovations are being made to improve efficiency.

Current resonance (multi-resonance) type AC-DC converters, such as that described in Patent Document 1, are known as insulation type AC-DC converter technology of the prior art which can suppress switching losses even at higher frequencies. FIG. 10 is a block diagram showing the electrical configuration of such a multi-resonance type AC-DC converter 1. This converter 1 substantially comprises a diode bridge db, smoothing capacitor c1, and DC-DC converter 2. The sinusoidal alternating current voltage Vac from the commercial power supply 3 is input via a current fuse f to the diode bridge db and smoothing capacitor c1, and a rectified and smoothed DC voltage is output as the power supply voltage of the DC-DC converter 2.

In the DC-DC converter 2, the power supply voltage is applied to the two-stage series switching elements q1 and q2; connected in parallel with one of the switching elements q2 are a series resonance circuit, comprising a choke coil 11, a primary winding t1 of an insulation transformer t, and capacitor c2, as well as a capacitor c3. The secondary winding t2 of the insulation transformer t are connected, via the diodes d1 and d2 respectively, to the high-side terminal of a smoothing capacitor c4, and a center tap is connected to the low-side terminal of the smoothing capacitor c4. By means of this DC-DC converter 2, the desired DC voltage, rectified and smoothed, is supplied to the DC load 4.

FIG. 11 shows waveforms at various portions, for use in explaining the operation of the above circuit of the prior art. Vg1 and Vg2 are gate signals applied by the control circuit 5 to the MOSFETs q1, q2 which are switching elements. In response to these gate signals Vg1, Vg2, the switching elements q1, q2 are turned on and off in alternation, and the drain-source voltages and drain currents thereof assume the waveforms Vq1, Iq1 and Vq2, Iq2, respectively. Vc2 is the voltage applied to the capacitor c2; by setting the series circuit to appropriate LC series resonance conditions for the switching frequency, a substantially sinusoidal current resonance state results.

Id1 and Id2 are the current waveforms of the diodes d1, d2 on the secondary side of the insulation transformer t; there exist conducting and non-conducting intervals with the timing shown, due to the difference between the voltage induced on the secondary side of the insulation transformer t and the DC voltage of the smoothing capacitor c4. During an interval in which a diode d1 or d2 is conducting, the secondary side of the insulation transformer t is in a short-circuited state via the diode d1 or d2. If for simplicity the insulation transformer t is assumed to be a non-gap transformer (with close coupling between the primary winding t1 and the secondary winding t2), then the primary-side excited inductance of the insulation transformer t is also substantially short-circuited, so that the inductor 11 and capacitor c3 undergo series resonance. On the other hand, during intervals in which both diodes d1 and d2 are non-conducting the secondary side of the insulation transformer t is in the open-circuit state, and the capacitor c3 and combined value of the inductor 11 and the transformer excited inductance (10) undergo series resonance.

Hence the resonance frequency f1 of the circuit in the interval W1 in which diode d1 or d2 is conducting is $\frac{1}{2}\pi(11 \cdot c3)^{1/2}$, and the resonance frequency f2 in the non-conducting interval W2 is $\frac{1}{2}\pi((11+10) \cdot c3)^{1/2}$. Hence the resonance frequency f2 is lower than the resonance frequency f1. In FIG. 11, td is the dead-off time, and T is one period.

From these operation waveforms, when the switching element q1 or q2 is turned on, the switching current is a somewhat negative current (flowing in the internal diode of a MOSFET), so that zero-current switching (ZCS) operation is possible, and switching losses are extremely low. And, when the switching element q1 or q2 is turned off, during the dead-off interval the capacitor c3 connected in parallel with the switching element q2 absorbs resonance energy of the inductor 11, and the applied voltage rises with a gentle gradient, so that zero-voltage switching (ZVS) operation by soft switching is possible, and switching losses are extremely low.

In such a multi-resonance type AC-DC converter 1, there is suppression of the increase in switching losses which is a concern when the switching frequency is raised, so that such a design is well-suited to miniaturization. However, in this converter 1 the control circuit 5 monitors the output voltage via a feedback circuit 6, and when load fluctuation occurs, the switching frequency is changed to perform fluctuation compensation in order to hold the output constant while maintaining multi-resonance waveforms. As a result, when an attempt is made to compensate the output in response to large-amplitude load fluctuations, fluctuations in the voltage of the commercial power supply, or other broad-range fluctuations, it becomes extremely difficult to maintain multi-resonance waveforms, and ultimately there is the problem that device selection and measures to address heat dissipation are indispensable in order to address deviation from the multi-resonant state. There is also a problem of imparting harmonic distortion to input current from the commercial power supply. Regulations regarding harmonic distortion are particularly strict in illumination applications.

FIG. 12 shows a standard AC-DC converter 11 with improved power factor designed to resolve such problems. This converter 11 substantially adopts the configuration of the above-described AC-DC converter 1, but with a filter circuit comprising an inductor 12 and capacitor c5 inserted on the input side of the diode bridge db, and with the ripple current full-rectified by the diode bridge db stepped up as-is by the boosting chopper circuit 12. And, the DC voltage resulting from smoothing by the smoothing capacitor becomes the power supply voltage of the step-down DC-DC converter 2.

The boosting chopper circuit 12 applies the ripple current output voltage from the diode bridge db to the series circuit of the choke coil 13, switching element (MOSFET) q3, and the source resistance thereof r. Through switching of the switching element q3 by the control circuit 13, a stepped-up voltage is extracted from the connection point of the choke coil 13 and the switching element q3, and is applied via the diode d3 to the smoothing capacitor c1. The control circuit captures input voltage signals, output voltage feedback signals, switching current signals, and synchronization signals (signals from auxiliary winding of the choke coil 13), controls the chopper switching element q3 such that the switching current value coincides with a reference value obtained from the product of the input voltage signal and the output voltage feedback signal, and through the effect of the filter circuit provided at the commercial power supply 3 and comprising the choke coil 12 and the capacitor c5, obtains a sinusoidal input current.

Through this configuration, an AC-DC converter with a higher input voltage to the DC-DC converter 2, with harmonic distortion suppressed in the input alternating current voltage Vac from the commercial power supply 3 and with a high power factor, can be realized. However, there are the problems of increases losses in the circuit as a whole due to cascade connection of two converters (12, 2), and of increases in cost and diminished advantages of miniaturization accompanying an increase in the number of components. By providing a boosting chopper circuit 12 in the first stage of the DC-DC converter 2, the input voltage is stabilized and there is no need for compensation for fluctuation in the voltage of the commercial power supply 3, and to this extent control by the control circuit 5 is facilitated.

FIG. 13 shows an AC-DC converter 21 with the cascade configuration of the two converters in the above configuration interchanged. This technology of the prior art is disclosed in Patent Document 2. In this converter 21, the output of the first-stage converter 22 is input to the converter of the second stage (boosting chopper circuit) 23 without smoothing. That is, in this AC-DC converter 21, the input alternating current voltage Vac from the commercial power supply 3 is rectified by the diode bridge db1, the resulting ripple current is input to the first-stage converter 22, conversion to a high-frequency AC voltage is performed by full-bridge inverter switching by means of the switching elements q11 to q14, output with the voltage changed by the insulation transformer t is obtained, and this output is again rectified by the diode bridge db2, and after passing through the second-stage converter 23 a DC output is obtained. The control circuit 24 of the converter executes control such that the AC input current iac is sinusoidal corresponding to the input alternating current voltage Vac, and such that the DC output voltage VA is constant.

The converter 23 applies the high-frequency ripple output voltage from the diode bridge db2 to the series circuit of the chopper coil 14 and switching element q3, and through switching of the switching element q3 by the control circuit 24, a stepped-up voltage is obtained from the connection point of the choke coil 14 and the switching element q3; this voltage is applied to the DC load 4 from the capacitor c6 via the diode d3.

Features of the AC-DC converter 21 shown in FIG. 13 are, together with measures addressing harmonic distortion, the ability to eliminate the high-voltage, high-capacitance smoothing capacitor c1 on the input side; the elimination of the need for measures to deal with inrush current at power-on as a result; and, the fact that the chopper coil 14 and capacitor c6 are used in common as the smoothing filter of the first-stage converter 22 and the smoothing filter of the second-stage converter 23.

However, there are the problems that no innovations are made to reduce losses in the first-stage full-bridge inverter (22), and that the overall efficiency is reduced by the cascade connection with the second-stage converter 23. Further, because the input current to the second-stage converter 23 is sinusoidal, the control circuit 24 must monitor the primary-side AC input current iac and input alternating current voltage Vac as well as the secondary-side DC output voltage VA of the insulation transformer t, so there is a need for a current transformer, voltage transformer, or other insulating means, and problems with respect to costs and shape occur.

Patent Document 1: Japanese Patent No. 3371595
Patent Document 2: Japanese Patent No. 2514885

DISCLOSURE OF THE INVENTION

An object of the invention is to provide an insulation type AC-DC converter which raises overall efficiency and enables a simplified structure, as well as a DC power supply device for LEDs using such a converter.

An insulation type AC-DC converter according to a first mode of the invention comprises: full-wave rectifying means performing full-wave rectification of an input current from a commercial power supply; a first converter provided after the full-wave rectifying means and having a multi-resonance type half-bridge DC-DC converter having an insulation transformer; and a second converter provided after the first converter, and outputting DC power stabilized at a desired voltage or current to a DC load, and having a boosting chopper circuit having control means for power factor improvement.

By means of this configuration, even when the switching frequency is raised through multi-resonance operation of the first converter, loss increases due to switching can be suppressed. And, it is easy to perform driving such that, when there is voltage fluctuation of the commercial power supply, a voltage substantially similar to the full-wave rectified waveform of the power supply voltage is obtained at the input portion of the boosting chopper circuit on the output side, and improved power factor operation of the second converter can easily be achieved. Moreover, through use of a half-bridge circuit the voltage input to the insulation transformer can be made low compared with cases in which a single-end circuit or similar is used, so that the insulation transformer can be miniaturized, low-voltage devices can be used as the switching elements used in the first converter as well, and MOSFETs or similar with low on-resistance can be selected. Through this superiority with respect to losses, the efficiency of the circuit as a whole can be improved.

Further, in addition to the efficiency-related advantages described above, switching operation need only be performed at frequencies within a range or at a single frequency at which the multi-resonance waveforms of the first converter can be maintained, and feedback from the load side across the insulation transformer is not necessary. By this means, the control functions of the first converter can be greatly reduced, so that for example self-excited driving is possible, and losses can be reduced through the simplification or omission of the power supply for the control circuit.

Further, a voltage substantially similar to the full-wave rectified waveform of the power supply voltage as described above is obtained at the input to the boosting chopper circuit which is the second-stage converter, and signals necessary for suppressing harmonic distortion are all obtained on the output side of the first-stage converter, that is, on the input side of the second-stage converter, so that a feed-forward circuit from the commercial power supply side to the second-stage converter across the insulation transformer is unnecessary. As a result, the circuit configuration related to improvement and control of the second converter power factor can be simplified, and the power supply for control of the second converter is easily obtained from the first converter output, so that there are no large losses.

Moreover, a high-voltage, large-capacitance electrolytic capacitor, which in the prior art has been provided on the input side of a multi-resonance type hybrid DC-DC converter having an insulation transformer, is no longer necessary, and so there are advantages for miniaturization and a thin design.

Moreover, a DC power supply device for LEDs of this invention not only has general applicability, but comprises an insulation type AC-DC converter which is especially suitable as a power supply for illumination equipment for which reduction of input harmonic distortion is important, and has an LED load lit by direct current as the load.

Through such a configuration, advantageous results for thin and miniaturized LED illumination can be expected.

BEST MODE FOR CARRYING OUT THE INVENTION

Figure 1:
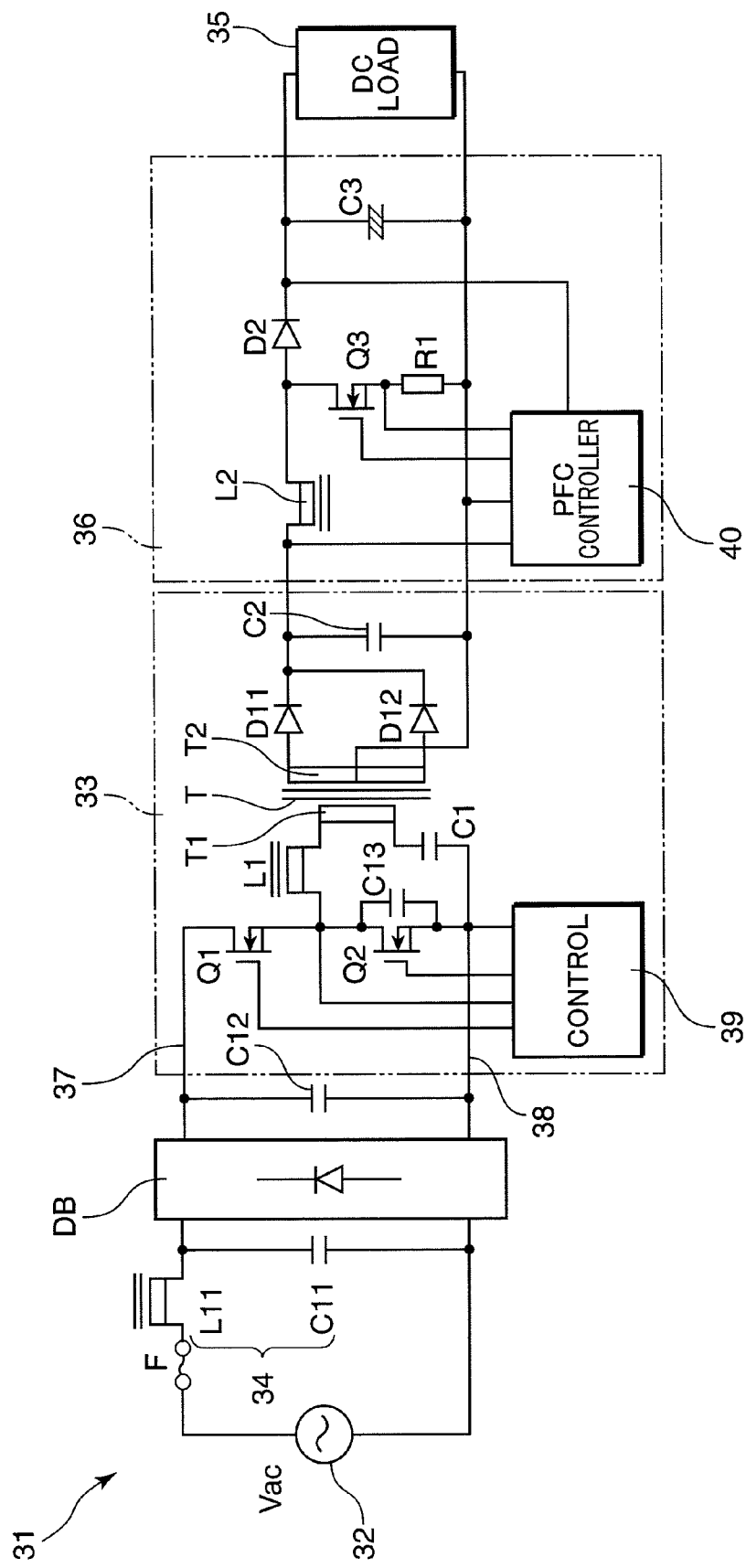
FIG. 1 is a block diagram showing an example of an insulation type AC-DC converter of a first aspect of the invention.

Below, embodiments of the invention are explained based on the drawings. In the drawings, the same symbols denote the same constituent portions, and redundant explanations thereof are omitted.

PRACTICAL EXAMPLE 1

Figure 2:
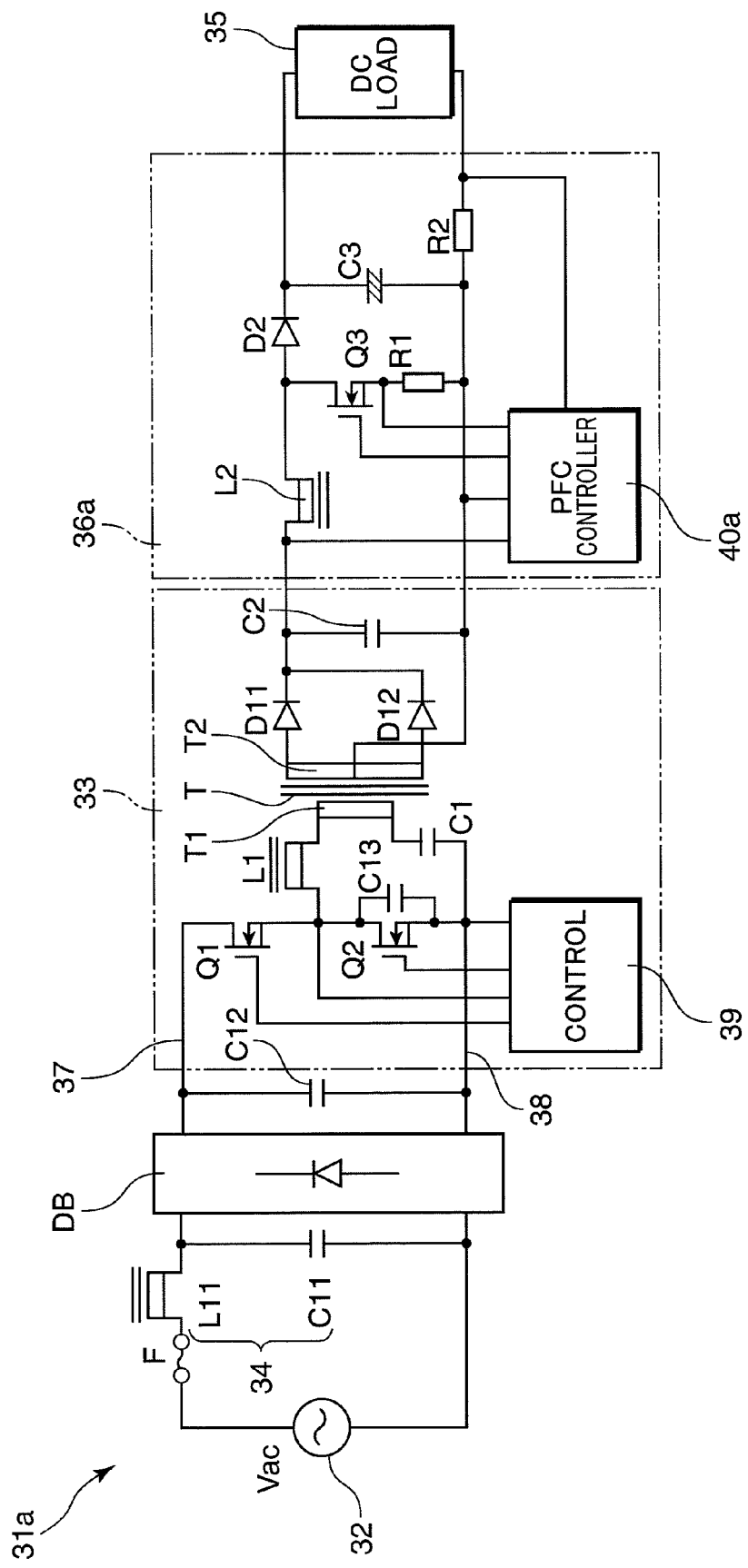
FIG. 2 is a block diagram showing another example of an insulation type AC-DC converter of the first aspect of the invention.

FIG. 1 and FIG. 2 are block diagrams showing the electrical configurations of insulation type AC-DC converters 31 and 31a of a first aspect of the invention. The converter 31 is substantially configured comprising a diode bridge DB, which is full-wave rectifying means performing full-wave rectification of an input current from a commercial power supply 32; a multi-resonance type half-bridge DC-DC converter 33, which is a first converter, provided in the stage after the diode bridge DB, having an insulation transformer T; a filter circuit 34, provided between the commercial power supply 32 and the half-bridge DC-DC converter 33, which smoothes the input current comprising high-frequency components; and, a boosting chopper circuit 36, which is a second converter, provided in the stage after the half-bridge DC-DC converter 33, which provides a DC voltage stabilized at a desired voltage to a DC load 35, and is provided to improve the power factor.

The sinusoidal alternating current voltage Vac from the commercial power supply 32 is input from the current fuse F, via the filter circuit 34 comprising the inductor L11 and capacitor C11, to the diode bridge DB, and after full-wave rectification, ripple current is output across the power supply lines 37, 38, passing through the capacitor C12 to secure a regenerative current loop, and is input as the power supply voltage to the half-bridge DC-DC converter 33.

The half-bridge DC-DC converter 33 is provided across the power supply lines 37, 38, and comprises a series circuit of first and second switching elements Q1, Q2, each having a reverse-parallel diode, not shown; a series resonance circuit, connected in parallel with one of the first and second switching elements Q1, Q2 (in FIG. 1 and FIG. 2, Q2), and comprising a first choke coil L1, the primary winding T1 of the insulation transformer T, and a first capacitor C1; a capacitor C13, connected in parallel to one of the first and second switching elements Q1, Q2 (in FIG. 1 and FIG. 2, Q2); two diodes D11, D12, the anodes of which are connected to either end of the secondary winding T2 of the insulation transformer T, and which are first rectifying means; a second capacitor C2, one end of which is connected to the cathodes of the diodes D11, D12, the other end of which is connected to a center tap of the secondary winding T2, and which performs envelope detection of the ripple current output from the diodes D11, D12; and, a control circuit 39, which is first control means to execute control of switching of the first and second switching elements Q1, Q2.

On the secondary side of the insulation transformer T, an output from a full-wave rectification composed of four diodes may be employed instead of an output from a center tap employing two diodes D11, D12 as described above. In this case, a center tap at the secondary winding T2 is unnecessary.

The boosting chopper circuit 36 to which the terminal voltage of the second capacitor C2 is provided comprises a series circuit, comprising a second choke coil L2 to which the ripple current output is applied, a third switching element Q3, and a current detection resistor R1 which detects current flowing in the third switching element Q3; a series circuit, arranged in parallel with the series circuit of the third switching element Q3 and current detection resistor R1, comprising a diode D2 which is second rectifying means and a smoothing capacitor C3; and, a control circuit 40, comprising a PFC controller which is second control means, to control switching of the third switching element Q3. To the control circuit 40 are input the current value of current flowing in the third switching element Q3 and obtained by the current detection resistor R1, and the terminal voltage of the second capacitor C2, as well as the load voltage. A DC load 35 is connected in parallel with the smoothing capacitor C3.

On the other hand, in the AC-DC converter 31a shown in FIG. 2, in the boosting chopper circuit 36a, the load current detected by a current detection resistor R2 inserted in series in the load line is input to the control circuit 40a instead of the load voltage; otherwise the configuration is similar to that of the AC-DC converter 31 shown in FIG. 1.

Figure 3:
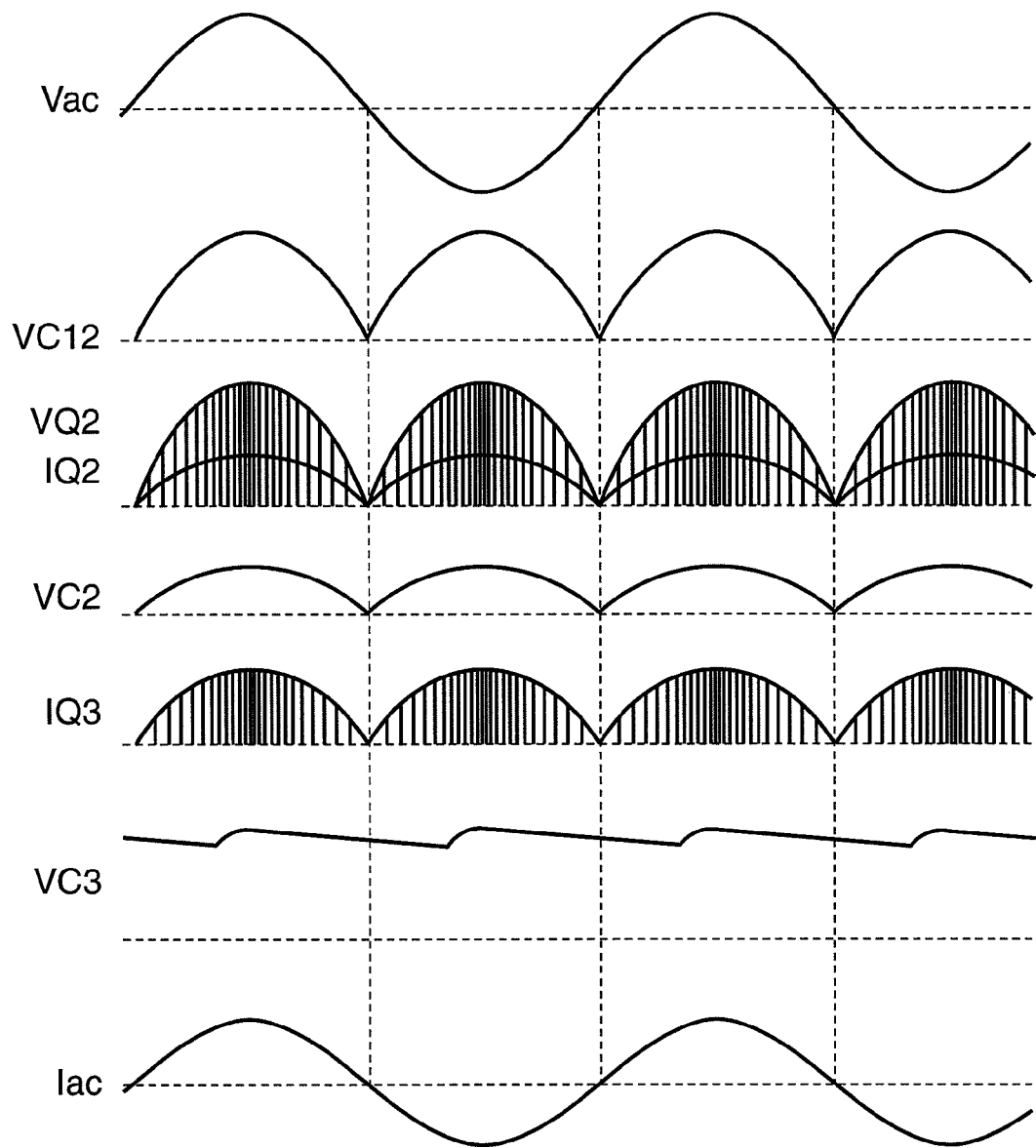
FIG. 3 is a waveform diagram of different portions, used to explain operation of the AC-DC converters.

FIG. 3 is a waveform diagram of different portions, used to explain operation of the AC-DC converters 31 and 31a. When the sinusoidal alternating current voltage Vac from the commercial power supply 32 is full-wave rectified by the diode bridge DB, a ripple voltage indicated by VC12 is output from the capacitor C12 across the power supply lines 37, 38 as the non-smoothed power supply voltage of the half-bridge DC-DC converter 33. VQ2 and IQ2 represent the voltage and current envelope of the switching element Q2; if the VQ2 envelope coincides with VC12, or the series resonance circuit is set to appropriate LC series resonance conditions for the switching frequency, and moreover the switching elements Q1, Q2 are made to operate at a single frequency or at frequencies in a range in which the multi-resonance waveforms can be maintained, then the envelope of the switching current waveform IQ2 is also similar in shape to the VC12.

Figure 4:
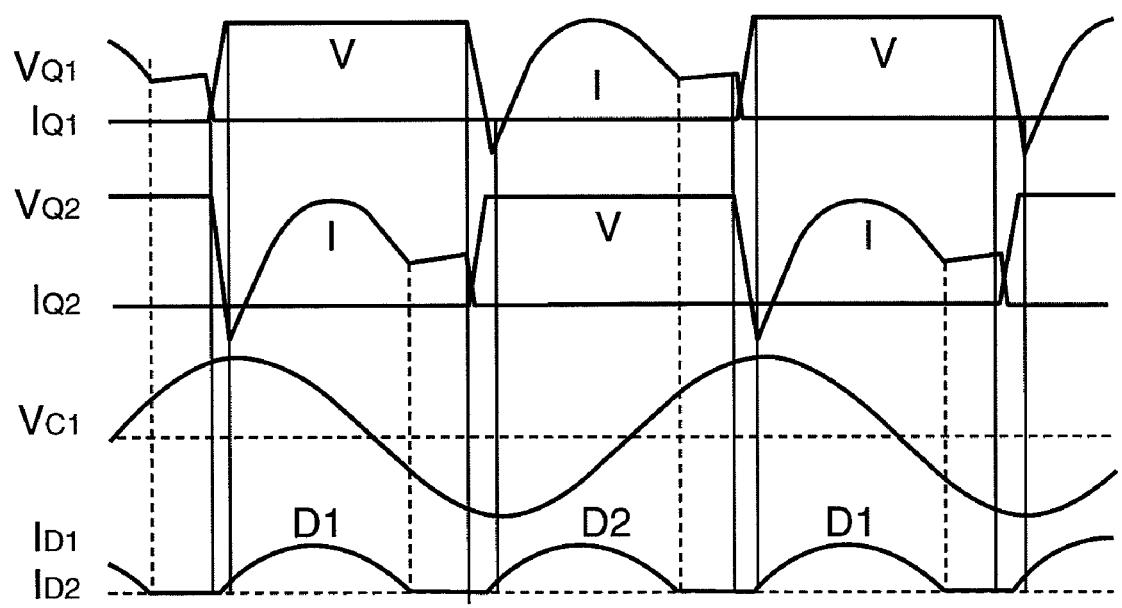
FIG. 4 is a waveform diagram of different portions, used to explain operation of the half-bridge DC-DC converter in the AC-DC converter.
Figure 5:
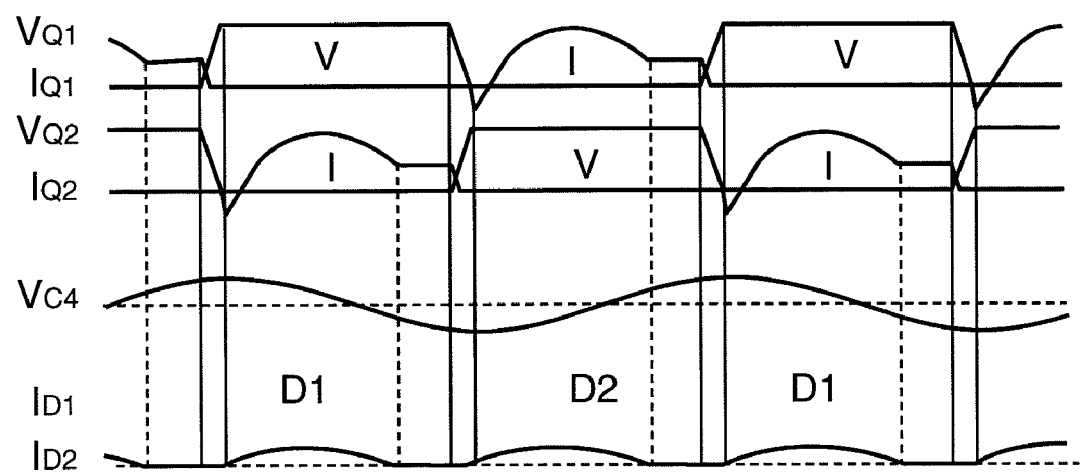
FIG. 5 is a waveform diagram of different portions, used to explain operation of the half-bridge DC-DC converter in the AC-DC converter.

FIG. 4 and FIG. 5 show the drain-source voltages VQ1, VQ2 and currents IQ1, IQ2 of the switching elements Q1, Q2, terminal voltage VC1 of the capacitor C1, and currents ID1, ID2 of the secondary-side diodes D1, D2, at the peaks and valleys of the input voltage VC12 of the half-bridge DC-DC converter 33. As shown in FIG. 4 and FIG. 5, when the currents flowing in the diodes D1, D2 provided on the secondary side of the insulation transformer T are controlled by the control circuit 39 so as to have a non-conducting period each cycle of high-frequency operation, at the time when the switching element Q1 or Q2 is turned on, the switching current becomes slightly negative current (flowing in the MOSFET internal diode), so that zero-current switching (ZCS) operation is possible. Consequently, switching losses are extremely low. At the time when the switching element Q1 or Q2 is turned off, during the dead-off period the capacitor C13 connected in parallel with the switching element Q2 absorbs the resonance energy of the inductor L1 and the applied voltage rises with a gentle gradient, so that zero-voltage switching (ZVS) operation by soft switching is possible. Consequently, switching losses are extremely low. The higher the operation frequency, the smaller the capacitance value of the capacitor C13 can be made. This capacitor C13 can be replaced by the junction capacitance of the switching elements Q1, Q2, so that the capacitor C13 can be omitted.

Further, when the half-bridge DC-DC converter 33 is in a resonance state as described above, a sinusoidal voltage similar to the input alternating current voltage Vac appears, as shown in FIG. 3, in the voltage VC2 detected by the capacitor C2 as the envelope of the voltage from the diodes D1, D2. Further, the current flowing in the third switching element Q3 becomes IQ3, and so the output voltage from the smoothing capacitor C3 is the desired DC voltage VC3 after rectification and smoothing. As a result, the input current Iac from the commercial power supply 32 is sinusoidal, and harmonic distortion can be suppressed.

The control circuit 40 comprises a PFC controller which detects (by detection means, not shown) the load voltage or load current and the voltage VC2, and based on the result of multiplication of an error amplifier output, obtained by comparing the load voltage or load current with a reference value determined in advance, with the result of detection of the voltage VC2, sets the switching current value for the third switching element Q3, and controls the switching of the third switching element Q3 such that the current value detected by the current detection resistor R1 is the aforementioned value.

Thus by means of the multi-resonance type half-bridge DC-DC converter 33 of the first stage, increases in losses due to switching can be suppressed even when the switching frequency is raised. Further, in response to fluctuations in the voltage Vac of the commercial power supply 32, some correction is added to maintain multi-resonance waveforms at valleys in the input voltage Vac. Primarily, however, the first and second switching elements Q1, Q2 are driven such that a voltage VC2 similar to the full-wave rectified waveform VC12 of the power supply voltage Vac is obtained at the input portion of the boosting chopper circuit 36 on the output side. Thus, switching losses of the first and second switching elements Q1, Q2 can be suppressed. In addition the voltage waveform which is rectified by the diodes D1, D2 provided on the secondary side of the insulation transformer T and to which the envelope detection is performed by the capacitor C3, can be made substantially similar in shape to the full-wave rectified voltage waveform of the commercial power supply 32. Moreover, by using a half-bridge circuit, the voltages VQ1, VQ2 input to the insulation transformer T can be made low compared with cases in which a single-end circuit or similar is used, so that the transformer T can be made smaller, the switching elements Q1, Q2 used in the converter 33 can have lower voltage ratings, and MOSFETs with lower on-resistances and similar can be selected for use. In these ways, overall efficiency can be raised.

The voltage rating of the converter 33 can be lowered as described above, and moreover it is sufficient to perform switching operation of the converter 33 at one frequency or within a frequency range enabling maintenance of the multi-resonance waveforms, and feedback from the side of the load 35 across the insulation transformer T is unnecessary. Hence functions of the control circuit 39 can be greatly reduced, so that for example self-excited driving is possible, and losses can be further reduced through the simplification or omission of the power supply for the control circuit 39.

Further, as described above, a voltage VC2 substantially similar to the full-wave rectified waveform VC12 of the power supply voltage Vac can be obtained as an input to the boosting chopper circuit 36 which is the second-stage converter. And, signals necessary to suppress harmonic distortion are all obtained on the output side of the first-stage converter 33, that is, on the input side of the boosting chopper circuit 36, so that there is no need either for a feed-forward circuit from the commercial power supply side to the boosting chopper circuit 36 across the insulation transformer. By this means, the circuit configuration necessary for power factor improvement control of the control circuit 40 in the boosting chopper circuit 36 can be simplified, and the power supply of the control circuit 40 can easily be obtained from the output of the converter 33, so that large losses do not occur.

Figure 10:
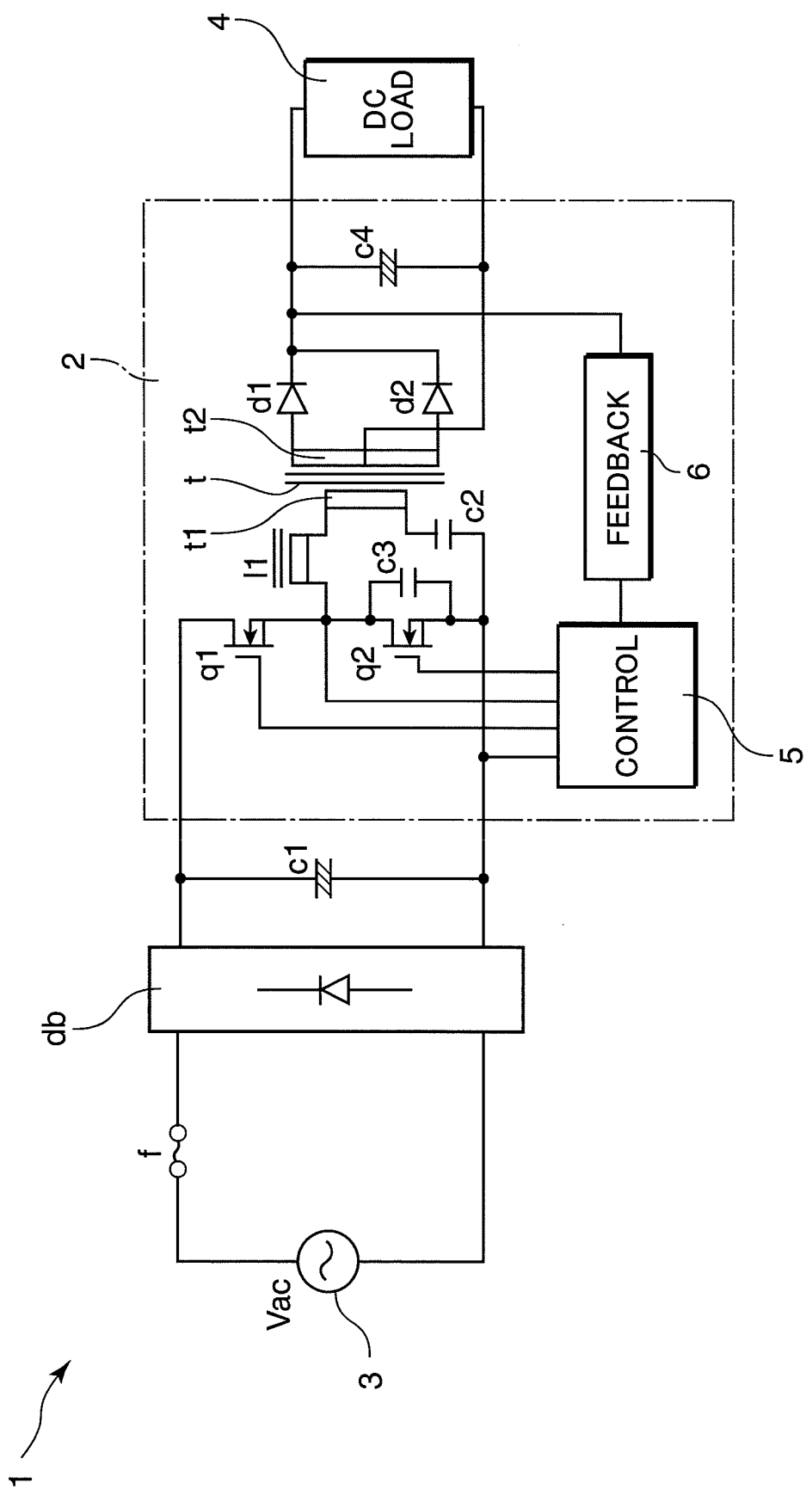
FIG. 10 is a block diagram showing the electrical configuration of a representative multi-resonance type AC-DC converter of the prior art.
Figure 11:
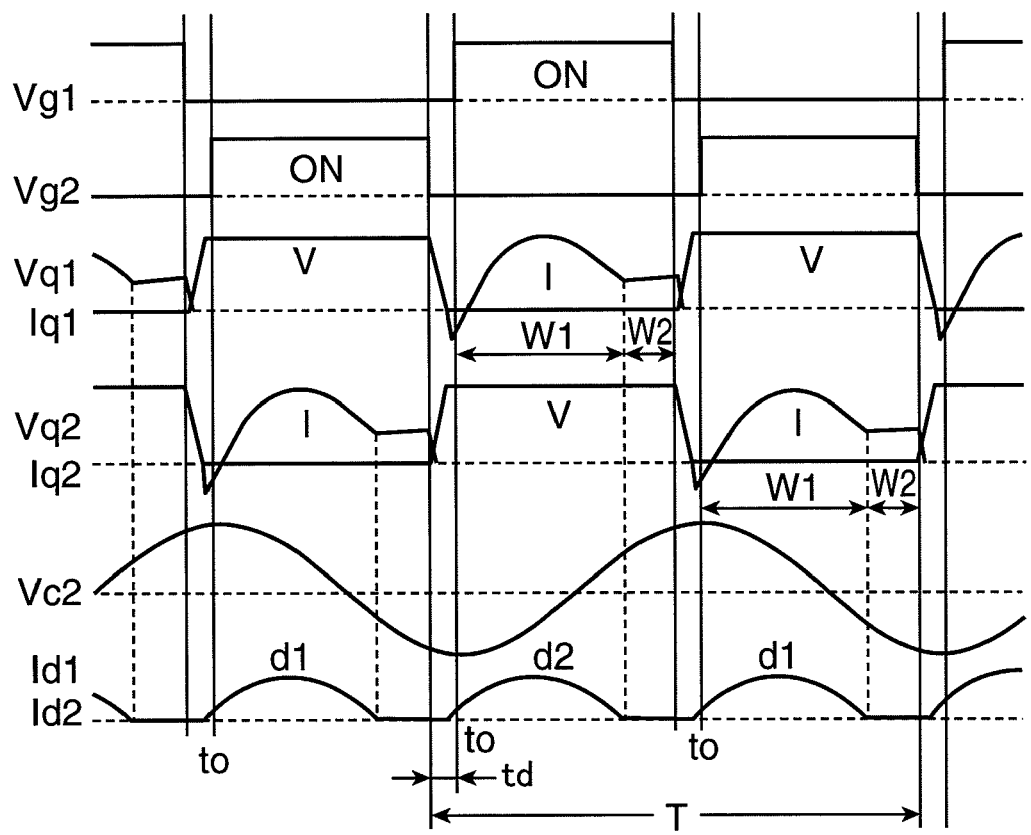
FIG. 11 is a waveform diagram of different portions, used to explain operation of the AC-DC converter shown in FIG. 10.
Figure 12:
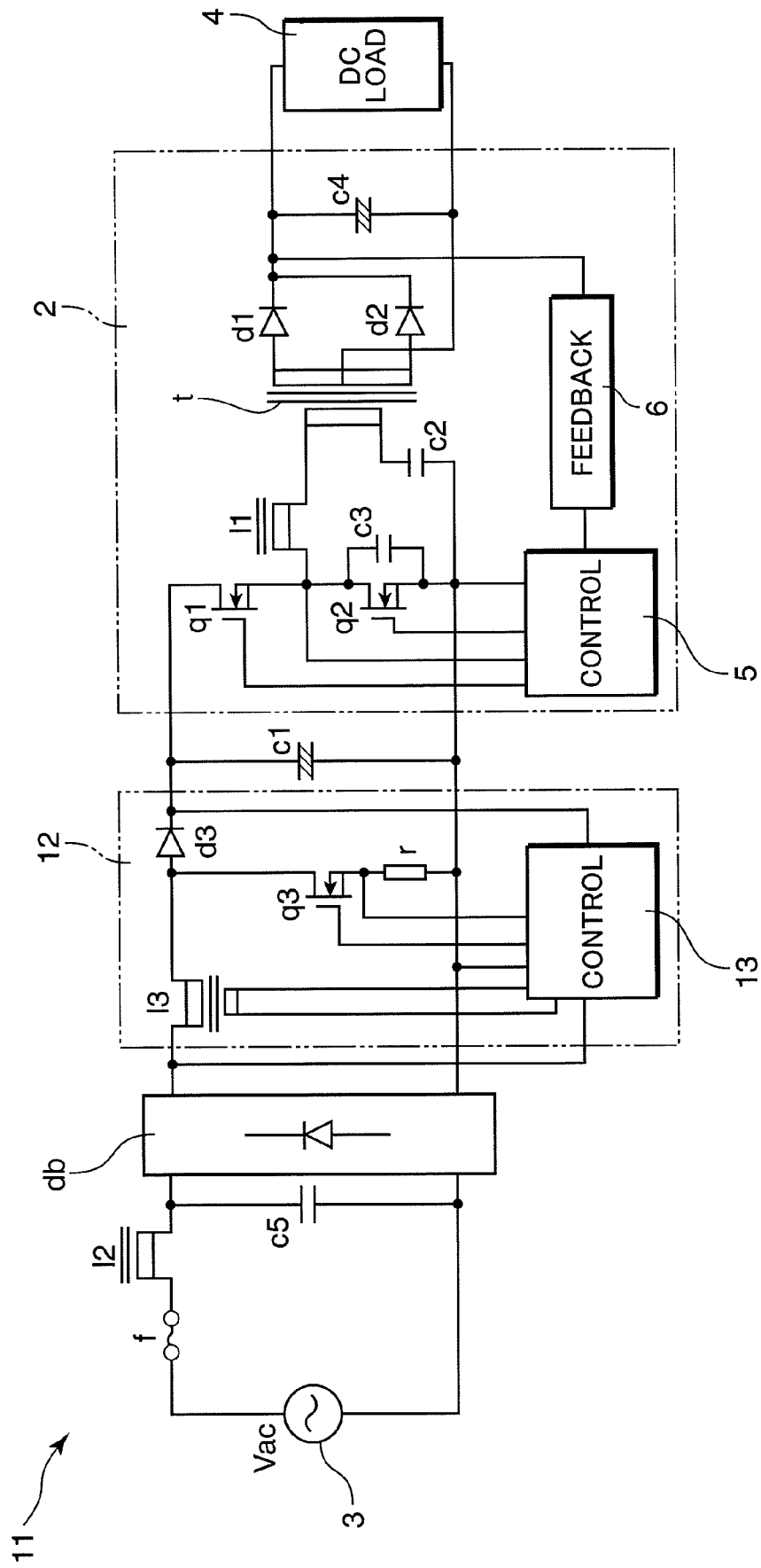
FIG. 12 is a block diagram showing the electrical configuration of another multi-resonance type AC-DC converter of the prior art; and, FIG. 13 is a block diagram showing the electrical configuration of still another multi-resonance type AC-DC converter of the prior art.
Figure 13:
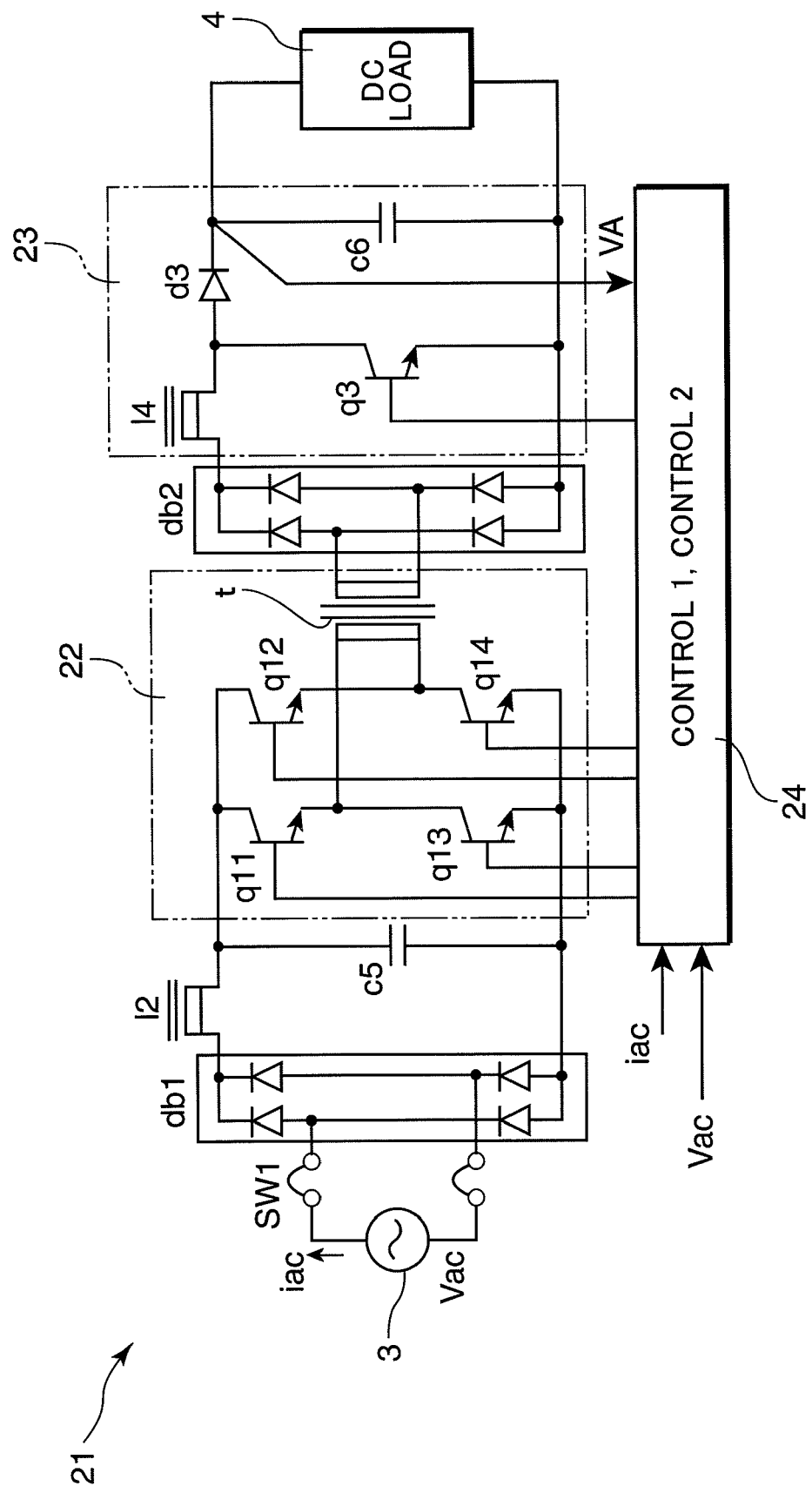

Further, in the technology of the prior art shown in FIG. 10 and FIG. 12, a high-voltage, high-capacitance electrolytic capacitor c1 is provided on the input side of the multi-resonance type half-bridge DC-DC converter 2 having an insulation transformer t, whereas in these AC-DC converters 31 and 31a such a capacitor is unnecessary, so that miniaturization and thin design are possible.

The above-described insulation type AC-DC converters 31 and 31a are of course useful as general-purpose power supplies, and are particularly well-suited as power supplies for illumination equipment, for which reduction of input harmonic distortion is important, and so are expected to be effective for use in compact and thin LED illumination. In this case, among the constant-voltage control shown in FIG. 1 and the constant-current control shown in FIG. 2, constant-current control, enabling constant brightness, is suitable.

PRACTICAL EXAMPLE 2

Figure 6:
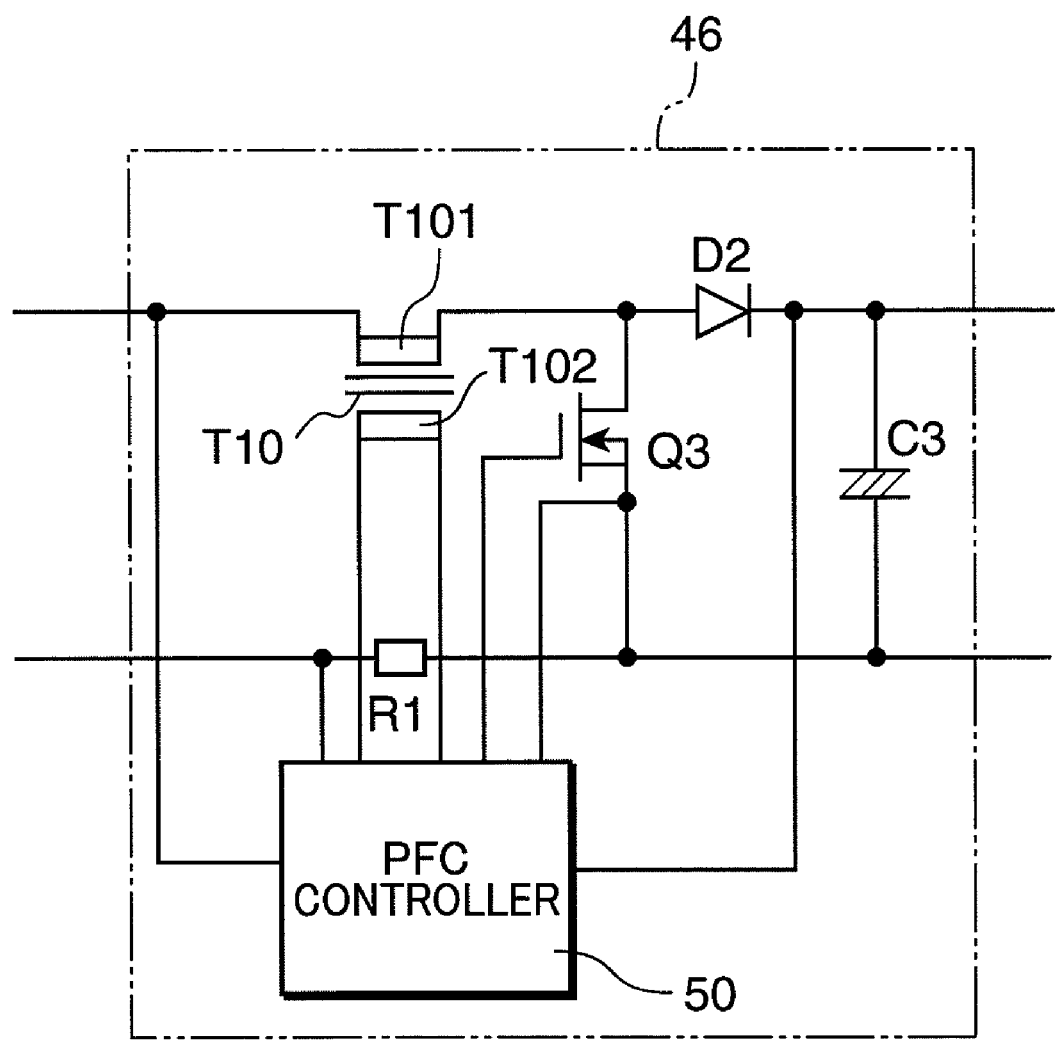
FIG. 6 is a block diagram showing the electrical configuration of the boosting chopper circuit in the insulation type AC-DC converter of a second aspect of the invention.

FIG. 6 is a block diagram showing the electrical configuration of the boosting chopper circuit 46 in the insulation type AC-DC converter of a second aspect of the invention. In this AC-DC converter, the configuration other than the boosting chopper circuit 46 is similar to that of the AC-DC converters 31 and 31a of FIG. 1 and FIG. 2 described above, and an explanation is omitted. The boosting chopper circuit 46 is similar to the above-described boosting chopper circuit 36, and the same reference symbols are assigned to corresponding portions, explanations of which are omitted. It should be noted that in this boosting chopper circuit 46, the second choke coil L2 comprises the primary winding T101 of the transformer T10, and the voltage induced in the auxiliary winding T102 thereof is input to the control circuit 50. Also, the control circuit 50 detects the current I101 flowing in the primary winding T101 which are the second choke coil, and when the current I101 is substantially zero, turns on the third switching element Q3.

Figure 7A:
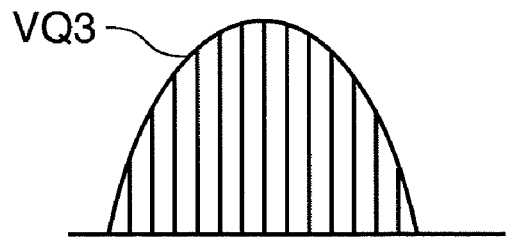
FIGS. 7A to 7C are waveform diagrams used to explain operation of the boosting chopper circuit shown in FIG. 6.
Figure 7B:
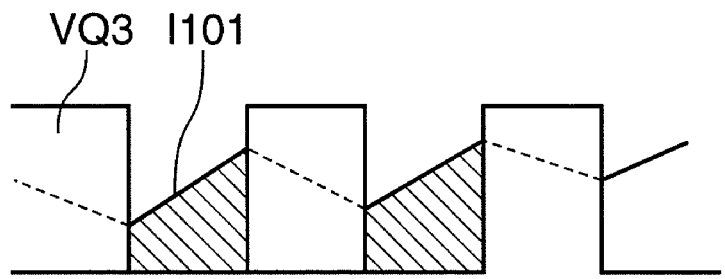
Figure 7C:
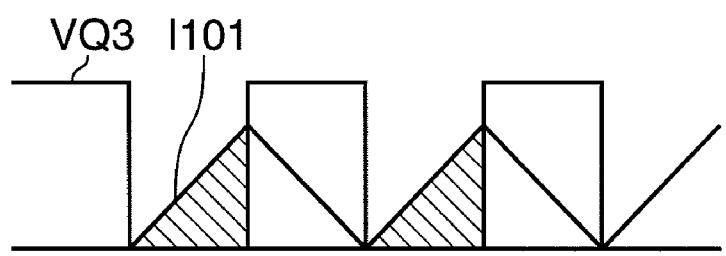

FIG. 7A shows the source-drain voltage VQ3 of the third switching element Q3; upon enlargement, FIG. 7B and FIG. 7C are obtained. FIG. 7B shows the winding current of the choke coil L2 in Practical Example 1; whereas this is a continuous current, FIG. 7C shows the winding current I101 in Practical Example 2, which is a discontinuous current. The latter is preferable for driving a comparatively small load, such as for example 150 to 300 W. In FIG. 7B and FIG. 7C, the gradient portions are the current quantities flowing when the third switching element Q3 is turned on.

Further, the detection resistor R1 for switching current detection is changed to the input portion, but the position of the detection resistor R1 may be decided according to the specifications of the general-use PFC controller IC used as the control circuit 50.

PRACTICAL EXAMPLE 3

Figure 8:
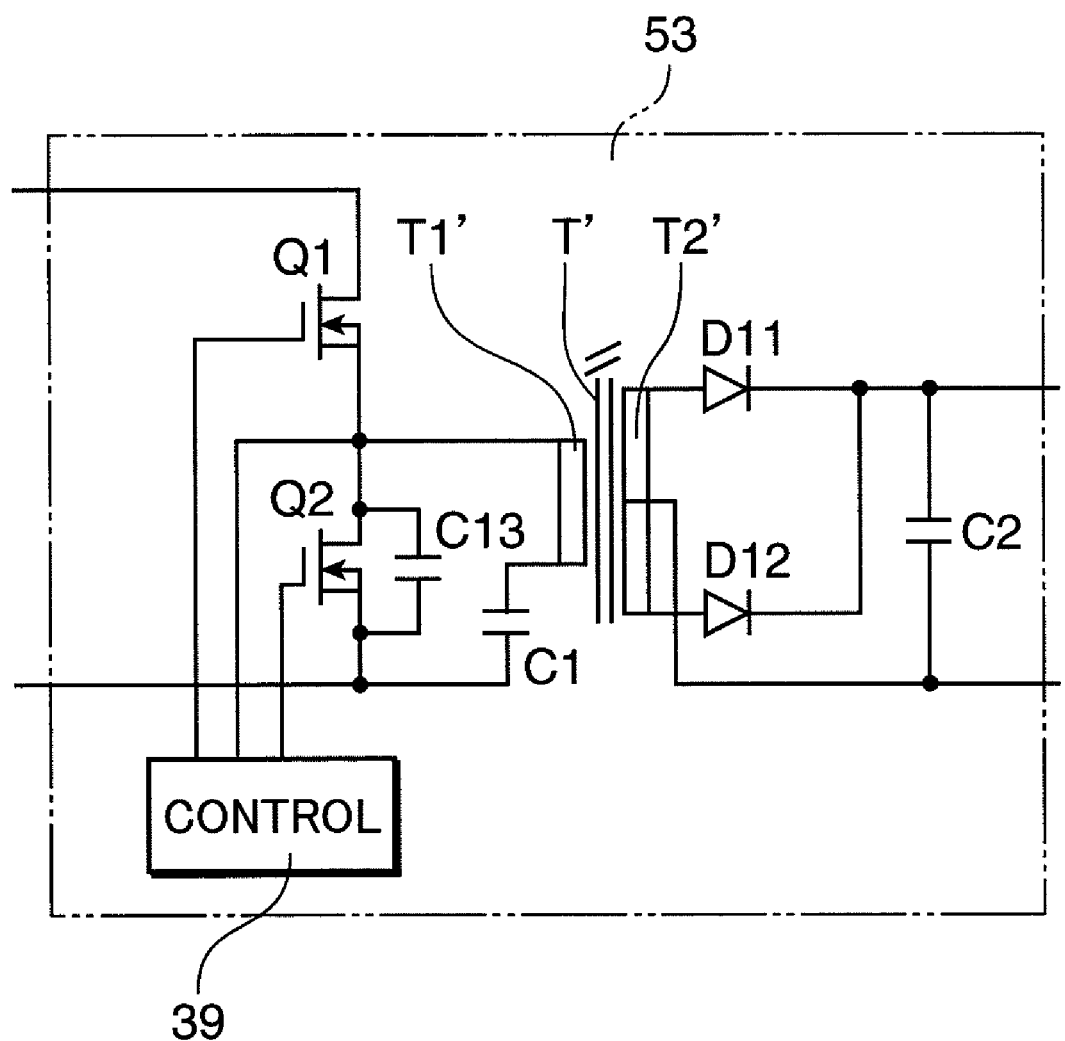
FIG. 8 is a block diagram showing the electrical configuration of the half-bridge DC-DC converter in the insulation type AC-DC converter of a third aspect of the invention.

FIG. 8 is a block diagram showing the electrical configuration of the half-bridge DC-DC converter 53 in the insulation type AC-DC converter of a third aspect of the invention. In this AC-DC converter, the configuration other than the DC-DC converter 53 is the same as in the AC-DC converters 31 and 31a of FIG. 1 and FIG. 2 above, and explanations are omitted. The DC-DC converter 53 is similar to the above-described DC-DC converter 33, and the same reference symbols are assigned to corresponding portions, with explanations thereof omitted. It should be noted that in this DC-DC converter 53, the first choke coil L1 and insulation transformer T are formed by a single leakage transformer T'.

That is, by reducing the coupling between winding of the above-described insulation transformer T to generate leakage inductance, when forming the series resonance circuit, the primary winding T1' of the leakage transformer T' can also be made to function as the first choke coil L1. By this means, the first choke coil L1 can be omitted.

PRACTICAL EXAMPLE 4

Figure 9:
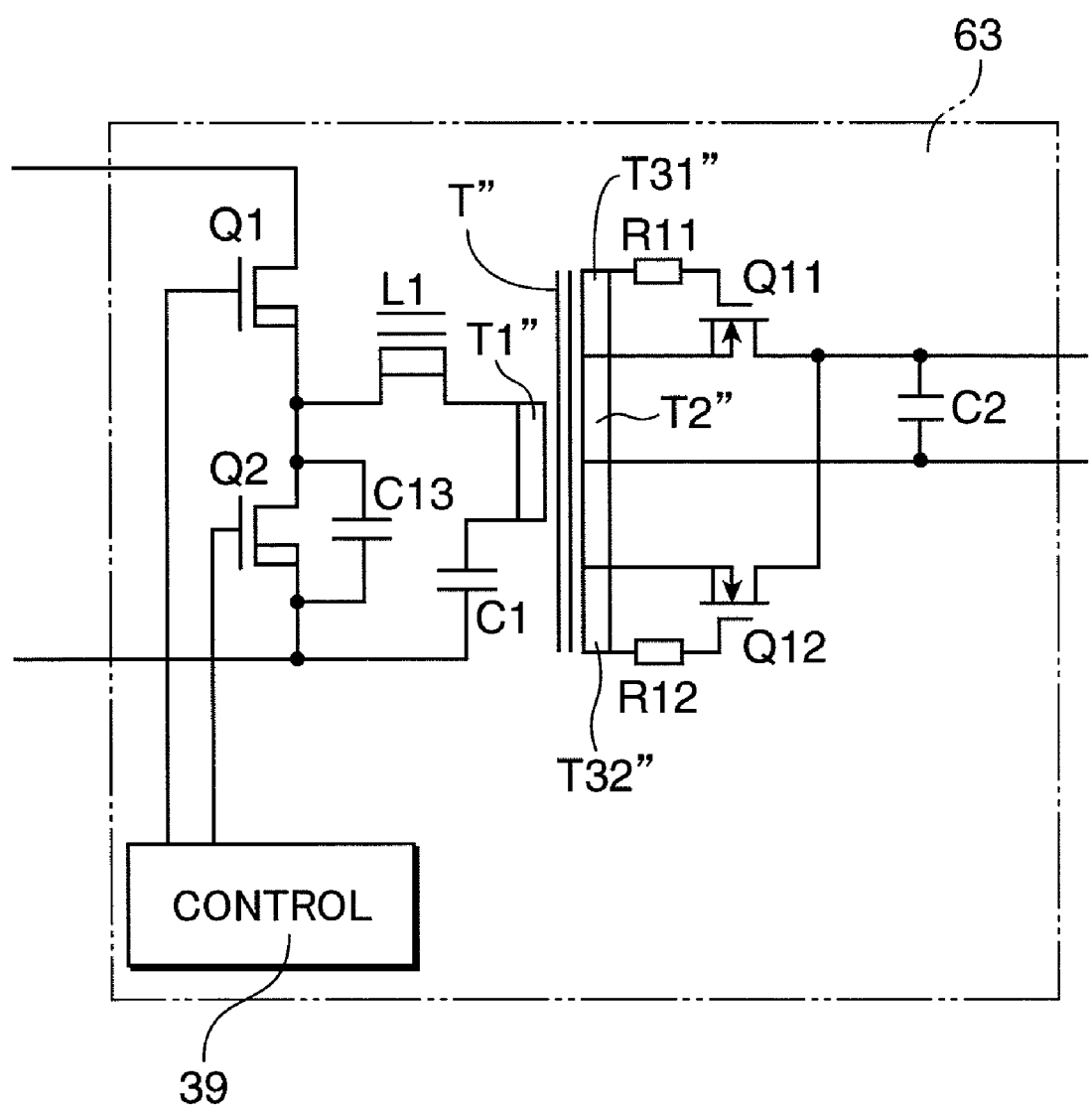
FIG. 9 is a block diagram showing the electrical configuration of the half-bridge DC-DC converter in the insulation type AC-DC converter of a fourth aspect of the invention.

FIG. 9 is a block diagram showing the electrical configuration of the half-bridge DC-DC converter 63 in the insulation type AC-DC converter of a fourth aspect of the invention. In this AC-DC converter, the configuration other than the DC-DC converter 63 is the same as in the AC-DC converters 31 and 31a of FIG. 1 and FIG. 2 above, and explanations are omitted. The DC-DC converter 63 is similar to the above-described DC-DC converter 33, and the same reference symbols are assigned to corresponding portions, with explanations thereof omitted. It should be noted that in this DC-DC converter 63, in place of the first and second diodes D11 and D12, MOSFETs Q11 and Q12 are used, and synchronous rectification is performed.

Specifically, a center tap of the secondary winding T2" of the insulation transformer T" is taken as GND for the secondary-side circuit, the two ends of the secondary winding T2" are connected to the source terminals of the MOSFETs Q11 and Q12, and the second capacitor C2 is connected across the secondary-side GND and the two drain terminals connected together. The gate terminals of the MOSFETs Q11 and Q12 are connected, via the driving resistors R11 and R12, to the winding T31", T32" respectively, added to the secondary winding T2". And, the voltages induced across these winding T31", T32" turn on the MOSFETs Q11, Q12, in synchronization with the source-gate forward-biasing of the MOSFETs Q11, Q12 respectively. If as the MOSFETs Q11 and Q12 devices with low on-resistances are used, then compared with a case in which the diodes d11, D12 are used, losses accompanying rectification can be greatly reduced.

The insulation type AC-DC converter according to one mode of the invention comprises a first converter, in turn comprising full-wave rectifying means performing full-wave rectification of an input current from a commercial power supply and a multi-resonance type half-bridge DC-DC converter having an insulation transformer and provided after the full-wave rectifying means, and a second converter, in turn comprising a boosting chopper circuit having control means for power factor improvement, provided after the first converter, and which outputs DC power stabilized at a desired voltage or current to a DC load.

By means of the above configuration, in an insulation type AC-DC converter in which the input current from a commercial power supply is converted into a high frequency to obtain an insulated direct current, first a multi-resonance type DC-DC converter having an insulation transformer is used as a first converter, and a boosting chopper circuit is used as a second converter for power factor improvement.

Hence through multi-resonance operation of the first converter, increases in losses due to switching can be suppressed even when the switching frequency is raised. Further, in response to fluctuations in the voltage of the commercial power supply, some correction is added to maintain multi-resonance waveforms at valleys in the input voltage. Primarily, however, driving can easily be performed such that a voltage similar to the full-wave rectified waveform of the power supply voltage is obtained at the input portion of the boosting chopper circuit on the output side, and operation for power factor improvement in the second converter can easily be performed. Moreover, by using a half-bridge circuit, the voltages input to the insulation transformer can be made low compared with cases in which a single-end circuit or similar is used, so that the transformer can be made smaller, the switching elements used in the first converter can have lower voltage ratings, and MOSFETs with lower on-resistances and similar can be selected for use. Through such superiority with respect to losses, overall circuit efficiency can be raised.

Further, in addition to the efficiency-related advantages described above, switching operation need only be performed at frequencies within a range or at a single frequency at which the multi-resonance waveforms of the first converter can be maintained, and feedback from the load side across the insulation transformer is not necessary. By this means, the control functions of the first converter can be greatly reduced, so that for example self-excited driving is possible, and losses can be reduced through the simplification or omission of the power supply for the control circuit.

Further, a voltage substantially similar to the full-wave rectified waveform of the power supply voltage as described above is obtained at the input to the boosting chopper circuit which is the second-stage converter, and signals necessary for suppressing harmonic distortion are all obtained on the output side of the first-stage converter, that is, on the input side of the second-stage converter, so that a feed-forward circuit from the commercial power supply side to the second-stage converter across the insulation transformer is unnecessary. As a result, the circuit configuration related to improvement and control of the second converter power factor can be simplified, and the power supply for control of the second converter is easily obtained from the first converter output, so that there are no large losses.

Moreover, a high-voltage, large-capacitance electrolytic capacitor, which in the prior art has been provided on the input side of a multi-resonance type hybrid DC-DC converter having an insulation transformer, is no longer necessary, and so there are advantages for miniaturization and thin designs.

Further, in an insulation type AC-DC converter according to one mode of the invention, the first converter comprises a multi-resonance type half-bridge DC-DC converter, in turn comprising a series circuit of first and second switching elements, provided across the power supply lines from the full-wave rectification means; a series resonance circuit, connected in parallel with one of the first and second switching elements, and comprising a first choke coil, the primary winding of the insulation transformer, and a first capacitor; a plurality of first rectifying means, provided on the secondary side of the insulation transformer; a second capacitor, which performs envelope detection of the output from the first rectifying means; and, first control means, which controls switching of the first and second switching elements at frequencies in a range or at a single frequency enabling maintenance of the multi-resonance waveforms.

Moreover, in an insulation type AC-DC converter according to one mode of the invention, the second converter comprises a boosting chopper circuit having a power factor improvement function, comprising a series circuit, connected across the terminals of the second capacitor, comprising a second choke coil and a third switching element; a series circuit, connected across the terminals of the third switching element, comprising a smoothing capacitor connected in parallel with the DC load and second rectifying means; first detection means, which detects the current in the third switching element; second detection means, which detects the terminal voltage of the second capacitor; third detection means, which detects the load voltage or current; and, second control means, which sets the switching current value of the third switching element based on detection results of the second detection means and detection results of the third detection means, such that the load voltage or current detected by the third detection means is a reference value determined in advance, and controls the third switching element such that the detection result of the first detection means is the setting value.

In the above configuration, by operating the first converter such that, at phase angles of the full-rectified waveform of the commercial power supply input to the first converter or at nearly all phase angles excluding valleys in the voltage, a resonance state can be maintained in the series resonance circuit comprising the first choke coil, primary winding of the insulation transformer, and first capacitor (such that there are intervals in each period of the high-frequency operation in which the current of the first rectifying means provided on the secondary side of the insulation transformer does not flow), switching losses in the first and second switching elements can be suppressed, and moreover the voltage waveform rectified by the plurality of first rectifying means provided on the secondary side of the insulation transformer, envelope detection of which is performed by the second capacitor, is substantially similar in shape to the full-wave rectified voltage waveform of the commercial power supply. By multiplying the detection result by the second detection means for the terminal voltage of the second capacitor with an error amplifier output obtained by comparing the detection result for the load voltage or current detected by the third detection means with a reference value determined in advance, and setting the current value for the third switching element, and through switching control by the second control means such that the current value of the third switching element detected by the first detection means coincides with the setting value, while adjusting the envelope of the input current to the second converter to the terminal voltage of the second capacitor which is the input voltage thereof, that is, to the full-wave rectified voltage waveform of the commercial power supply, the desired DC output can be obtained. By making the input current waveform from the commercial power supply mostly sinusoidal in this way, harmonic distortion in the input current can be suppressed.

Further, through the appearance in the terminal voltage of the second capacitor of a voltage waveform substantially similar to the full-wave rectified waveform of the commercial power supply, signals necessary for power factor improvement control of the second converter are obtained on the secondary side of the insulation transformer, so that the signal transformer, photocoupler, or other insulation means which had been necessary to send signals from the primary side of the insulation transformer are unnecessary, resulting in advantages with respect to shape and cost.

Further, in an insulation AC-DC converter according to one mode of the invention, transformer winding serve as the second choke coil, and from auxiliary winding thereof the second control means detects the current flowing in the second choke coil, and turns on the third switching element at the time the current is substantially zero.

By means of the above configuration, discontinuous driving which is suitable for driving low loads with comparatively small capacitance can be performed.

Further, the insulation type AC-DC converter according to one mode of the invention uses one leakage transformer to form the first choke coil and the insulation transformer.

By means of the above configuration, by reducing the coupling between winding of the above-described insulation transformer to generate leakage inductance, when forming the series resonance circuit, the first choke coil in series with the primary winding of the insulation transformer can be omitted.

Further, in the insulation type AC-DC converter according to one mode of the invention, the first rectifying means comprises a synchronous rectification circuit using MOSFETs.

By means of the above configuration, losses due to the first rectifying means can be greatly reduced compared with cases in which diodes are used.

Further, the DC power supply device for LEDs according to one mode of the invention comprises an insulation type AC-DC converter, and has as the load an LED load lit by direction current.

By means of the above configuration, in addition to the obvious usefulness as a general-use power supply, the above-described insulation type AC-DC converter is ideal as a power supply for illumination equipment for which low harmonic distortion of the input is especially important, and advantageous results for uses in compact and thin LED illumination are anticipated.

In this Specification, portions described as means for achieving some functions are not limited to the configuration described in the Specification for achieving the functions, and any other units, portions, or similar which achieve the functions may be used.

INDUSTRIAL APPLICABILITY

By means of this invention, in an insulation type AC-DC converter, overall efficiency can be raised and moreover the structure can be simplified; in addition, such a converter can be widely used, and input harmonic distortion can be reduced, so that such a converter is ideal as an illumination equipment power supply, and advantageous results in thin and compact LED illumination devices are anticipated.

The invention claimed is:

1. An insulation type AC-DC converter, comprising:
   full-wave rectifying means performing full-wave rectification of an input current from a commercial power supply;
   a first converter provided after the full-wave rectifying means and having a multi-resonance type half-bridge DC-DC converter having an insulation transformer; and
   a second converter provided after the first converter, and outputting DC power stabilized at a desired voltage or current to a DC load, and having a boosting chopper circuit having control means for power factor improvement.

2. The insulation type AC-DC converter according to claim 1, wherein the first converter is formed by the multi-resonance type half-bridge DC-DC converter comprising:
   a series circuit of first and second switching elements, provided on power supply lines from the full-wave rectifying means;
   a series resonance circuit connected in parallel with one from among the first and second switching elements, and having a first choke coil, a primary winding of the insulation transformer, and a first capacitor;
   plurality of first rectifying means provided on a secondary side of the insulation transformer;
   a second capacitor, which detects an envelope of output from the first rectifying means; and
   first control means for controlling switching of the first and second switching elements at frequencies in a range or at a single frequency enabling maintenance of the multi-resonance waveforms.

3. The insulation type AC-DC converter according to claim 1, wherein the second converter is formed by the boosting chopper circuit having a power factor improvement function and comprising:
   a series circuit connected across terminals of the second capacitor and comprising a second choke coil and a third switching element;
   a series circuit connected across terminals of the third switching element and comprising a smoothing capacitor connected in parallel with a DC load and second rectifying means;
   first detection means for detecting current of the third switching element;
   second detection means for detecting a terminal voltage of the second capacitor;
   third detection means, for detecting a load voltage or current; and
   second control means for setting a switching current value of the third switching element based on a detection result of the second detection means and a detection result of the third detection means such that the load voltage or current detected by the third detection means is a reference value determined in advance, and for controlling the third switching element such that the detection result of the first detection means is the setting value.

4. The insulation type AC-DC converter according to claim 3, wherein the second choke coil is a transformer, and the second control means detects the current flowing in the second choke coil from auxiliary winding of the second choke coil and turns on the third switching element at the time the current is substantially zero.

5. The insulation type AC-DC converter according to claim 2, wherein the first choke coil and insulation transformer are formed by a single leakage transformer.

6. The insulation type AC-DC converter according to claim 2, wherein the first rectifying means is formed by a synchronous rectifying circuit having MOSFETs.

7. An LED DC power supply device, formed by the insulation type AC-DC converter according to claim 1, and having an LED load lit by direct current as the load.

8. An insulation type AC-DC converter, comprising:
   a full-wave rectifying section performing full-wave rectification of an input current from a commercial power supply;
   a first converter provided after the full-wave rectifying section and having a multi-resonance type half-bridge DC-DC converter having an insulation transformer; and
   a second converter provided after the first converter, and outputting DC power stabilized at a desired voltage or current to a DC load, and having a boosting chopper circuit having a control section for power factor improvement.

9. The insulation type AC-DC converter according to claim 8, wherein the first converter is formed by the multi-resonance type half-bridge DC-DC converter comprising:
   a series circuit of first and second switching elements, provided on power supply lines from the full-wave rectifying section;
   a series resonance circuit connected in parallel with one from among the first and second switching elements, and having a first choke coil, a primary winding of the insulation transformer, and a first capacitor;
   plurality of first rectifying sections provided on a secondary side of the insulation transformer;
   a second capacitor, which detects an envelope of output from the first rectifying section; and
   first control section for controlling switching of the first and second switching elements at frequencies in a range or at a single frequency enabling maintenance of the multi-resonance waveforms.

10. The insulation type AC-DC converter according to claim 8, wherein the second converter is formed by the boosting chopper circuit having a power factor improvement function and comprising:
    a series circuit connected across terminals of the second capacitor and comprising a second choke coil and a third switching element;
    a series circuit connected across terminals of the third switching element and comprising a smoothing capacitor connected in parallel with a DC load and a second rectifying section;
    a first detection section for detecting current of the third switching element;

a second detection section for detecting a terminal voltage of the second capacitor;

a third detection section, for detecting a load voltage or current; and a second control section for setting a switching current value of the third switching element based on a detection result of the second detection section and a detection result of the third detection section such that the load voltage or current detected by the third detection section is a reference value determined in advance, and for controlling the third switching element such that the detection result of the first detection section is the setting value.

11. The insulation type AC-DC converter according to claim 10, wherein the second choke coil is a transformer, and the second control section detects the current flowing in the second choke coil from auxiliary winding of the second choke coil and turns on the third switching element at the time the current is substantially zero.

12. The insulation type AC-DC converter according to claim 9, wherein the first choke coil and insulation transformer are formed by a single leakage transformer.

13. The insulation type AC-DC converter according to claim 9, wherein the first rectifying section is formed by a synchronous rectifying circuit having MOSFETs.

14. An LED DC power supply device, formed by the insulation type AC-DC converter according to claim 8, and having an LED load lit by direct current as the load.

* * * * *